April 27, 1965　　　L. R. BLAKE　　　3,180,799
REACTOR CONTROL BY SPACING OF FUEL
Filed Jan. 11, 1960
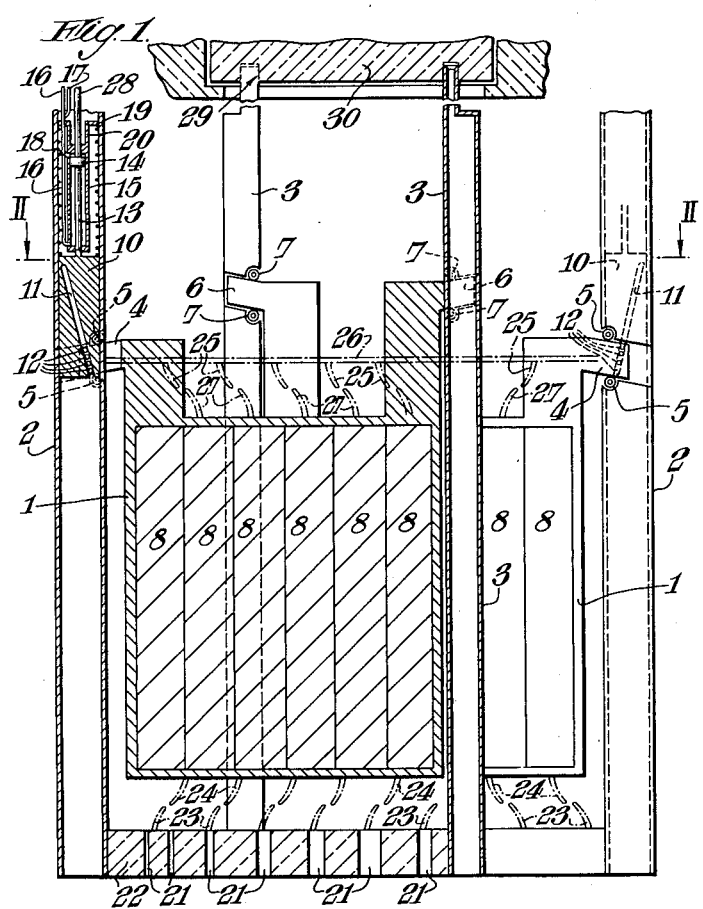
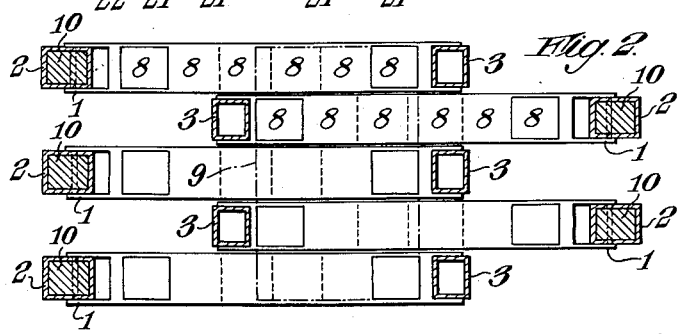
INVENTOR
LESLIE REGINALD BLAKE
BY Lawson and Taylor 3,180,799
REACTOR CONTROL BY SPACING OF FUEL
Leslie Reginald Blake, Thurso, Caithness, Scotland, assignor to United Kingdom Atomic Energy Authority, London, England
Filed Jan. 11, 1960, Ser. No. 1,803
Claims priority, application Great Britain, Jan. 12, 1959, 1,139/59
9 Claims. (Cl. 176—21)

This invention relates to nuclear reactors and it has particular application in reactors of the kind comprising a core of fuel element assemblies adapted to be immersed in a tank of liquid coolant. One such reactor is that known as a fast reactor (F.R.) and another such reactor is that commonly known as a materials testing reactor (M.T.R.). The present invention is concerned especially with the control of reactors of the specified kind.

An important problem in a fast reactor is that a change in core shape tending to raise core density is likely to lead to conditions which would require prompt rectification. The main factor which is likely to raise core density is melt-down due to fission product heating in the fuel on loss of coolant or, less likely, loss of coolant flow The present invention resides in a nuclear reactor wherein core components such as fuel element assemblies are held in the normal position of core establishment by forces exerted on them by the coolant flowing through the core, loss of coolant or coolant pressure, and therefore cessation of coolant flow, serving to release the fuel element assemblies for movement in a core-dispersing direction.

In one form of reactor according to the invention, vanes are provided in the coolant flow path and are so formed and disposed that the coolant flow exerts a component of force on each assembly in a direction serving to hold the assembly in its normal position of core establishment, loss of coolant or coolant pressure, and therefore cessation of coolant flow, serving to release the assembly for movement in a core-dispersing direction.

A constructional example embodying the invention will now be described with reference to the accompanying drawings, wherein:

FIGURE 1 is a side view in section and illustrates the fuel element assembly of a fast reactor, and FIGURE 2 is a plan view on line II—II of FIGURE 1.

Referring to the drawings, in the shown construction of fuel element assembly for a fast reactor, there is a plurality of fuel element frames or supports 1 adapted to be immersed in a tank of liquid coolant and supported by pillars 2 and 3 respectively, the frames 1 being adjacent to one another, alternate pillars 2 and 3 being offset, and alternative frames 1 being turned through 180°. Thus the frame 1 shown in section in FIGURE 1 has at its top a side arm 4 which is forked and inclined to the horizontal and is supported by rollers 5 mounted in the pillar 2, the said frame also having at its top an opposite side forked arm 6 of similar inclination to the arm 4 and supported by rollers 7 mounted in the pillar 3. The next adjacent frame is similar but is turned through 180°, its supporting pillars being offset as can clearly be seen from the drawings.

Each frame 1 constitutes a movable segment of the core and carries six rectangular nuclear fuel blocks 8, overlapping fuel blocks 8 of all the frames 1 forming the reactor core, illustrated by the dot-and-dash boundary line 9 in FIGURE 2. Movement of the frames 1 outwardly from the centre of the core serves to disperse the core and in the limiting position the dispersal is sufficient to render the core non-critical, whilst intermediate positions give varying degrees of control. It will be appreciated that the frames 1 will normally be caused by the influence of gravity to move outwardly (i.e., in the direction of the pillars 2) and downwardly due to the inclined surfaces of the arms 4 and 6, thereby dispersing the core. It will also be appreciated that the ability to move the frames 1 relative to one another gives control over the operation of the reactor and this can be utilised by providing an independent force acting to control the position of each frame 1 relative to its supporting pillars 2, 3. This force may be provided by utilising coolant under pressure to operate a slide 10 contained in each pillar 2, the interior of which is hollow. Each slide 10 has an inclined slot 11 engaged by pins or rollers 12 extending between the forks of the respective arm 4, movement of the slide 10 upwardly or downwardly in the pillar 2 serving to control the position of the frame 1 relative to the pillar 2. The slide 10 has a rod 13 carrying a piston 14 slidable in a cylinder 15, the cylinder 15 being connected to coolant under pressure at its lower end via the pipe 16 and being open to atmosphere or alternatively to an independent source of pressure, for example a pneumatic supply, at its upper end via the pipe 17. A compression spring 18 embraces the cylinder 15, being located at its upper end by a flange 19 on an extension 20 of the cylinder 15, and seating at its lower end on the top of the slide 10, the spring 18 serving to urge the slide 10 in a downward direction, and thereby move the frame 1 towards the pillar 2 in a core dispersing direction by the action of the slot 11 in slide 10 on the pins or rollers 12 of the arm 4. However, the frame 1 is held in its normal position, in which the core is established, by virtue of the coolant pressure in the cylinder 15 urging the piston 14 upwardly into the limiting position shown in FIGURE 1, overcoming the compressive force of the spring 18. Control of the position of the frame 1, which gives control over the reactor, can be effected by providing an adjustable bleed valve (not shown) in the pressure supply pipe 16, or by providing an adjustable by-pass (not shown) for coolant supplied to the cylinder 15, or by introducing an opposing pressure into the upper end of the cylinder 15 via the pipe 17, for example by an adjustable pressure pump connected in series with pipes 16 and 17.

A safety measure resides in the fact that on loss of coolant or if coolant pressure fails, the upward force on the piston 14 tending to move the frame 1 into or hold it in its core established position will be removed, allowing the weight of the frame 1 and the slide 10, assisted by the force exerted by the compression spring 18, to cause the frame to move into its limiting core dispersed position, thereby rendering the core non-critical and preventing occurrence of the worst consequences of loss of coolant or loss of coolant pressure with a critical core. This movement of the frame 1 on loss of coolant or coolant pressure can be assisted still further and possibly accelerated by arranging for an independent source of pressure, e.g., pneumatic pressure, to be automatically supplied via pipe 17 to the upper end of cylinder 15 on loss of coolant or coolant pressure.

In addition to or in lieu of employing the slide 10 and its associated slot 11, rod 13, piston 14, cylinder 15 and spring 18, to hold the frame 1 in its core established position by coolant pressure, the flow of coolant over the fuel blocks 8 can be utilised for this purpose. Coolant channels 21 in a plate 22 are provided beneath the frames 1 through which coolant passes in an upward direction to cool the fuel blocks 8. Vanes 23 (indicated in dot-and-dash lines in FIGURE 1) are mounted on the plate 22 and direct the coolant flow or some of it in a direction in which it exerts a horizontal component of force on vanes 24 (also shown in dot-and-dash lines in FIGURE 1) mounted on the underside of the respective frame 1, the component of force tending to move the frame 1 in the core establishing direction. Loss of coolant or coolant pressure results in removal of the said component of force and the frame 1 can then move under the influence of gravity into the core dispersed position, assisted by the spring 18 and where provided by the pneumatic pressure acting on the plunger 10 automatically brought into operation as previously referred to on loss of coolant or coolant pressure. If the coolant flow is downwardly, fixed vanes 25 mounted on an apertured plate 26 extending between the pillars 2 and 3, and vanes 27 mounted on the top of the respective frame 1, may be provided to cause the coolant flow to exert a component of force on the frame 1 in the core establishing direction. The vanes 25, plate 26 and vanes 27 are shown in dot-and-dash lines in FIGURE 1. This expedient can be effective in providing a large safety factor by arranging for strong forces tending to move the frames 1 from their core established position into their core dispersed position, the forces exerted by coolant flow then assisting the forces exerted by coolant pressure on the slide 10 to overcome the said large forces when coolant pressure is normal. The rod 13 of the slide 10 may have an upward extension 28 as shown in FIGURE 1, and serve with suitable mechanism (not shown) for indicating remotely the position of the respective frame 1 relative to the pillar 2. The upper ends of the pillars 3 are conveniently located in grooves 29 in a fixed upper shield plug 30.

The fuel blocks 8 may comprise core material only, or may comprise core material in the central region and reflector or blanket material in the outer regions with the frames 1 being made of suitable size to accommodate both materials.

Whilst the invention has been described above with reference to the fast reactor construction shown in the drawings, it also has a closely similar application in a materials testing reactor.

I claim:

1. In a nuclear reactor having a core including fuel elements over which a fluid coolant flows, apparatus comprising at least one frame for holding at least part of the fuel elements disposed in the reactor; means supporting said frame as to permit movement of the frame between a first position in which the fuel elements in the frame are disposed relative to the other fuel elements in the reactor to establish a critical core and a second position in which the fuel elements in the frame are disposed relative to the other fuel elements in the reactor to render the core sub-critical; means to bias the frame to said second position; and fluid operated means for translating energy of the coolant into force biassing said frame toward said first position.

2. Apparatus as defined in claim 1 wherein said last mentioned means comprises fluid pressure operated means and means for conducting at least a portion of the fluid coolant thereto to serve as a motive fluid therefor.

3. In a nuclear reactor having a core including fuel elements over which a fluid coolant flows, means supporting said fuel elements so as to provide at least two core segments moveable relative to each other between a first position in which said core is critical and a second position in which said core is sub-critical; means biasing at least one of said movable segments towards said second position; and fluid operated means for translating energy of the coolant into force biassing said at least one movable segment toward said first position.

4. Apparatus as defined in claim 3 wherein said fluid operated means comprises a fluid pressure operated means and means for conducting at least a portion of the fluid coolant to said fluid pressure operated means.

5. Apparatus as defined in claim 3 wherein said biassing means comprises inclined surfaces upon which at least one of said moveable segments is movably supported so that the weight of the segment biases the segment to move on said inclined surface towards said second position.

6. Apparatus as defined in claim 1 wherein the supporting means comprises inclined surfaces upon which said frame is movably supported so that the weight of the frame biases the frame to move on said inclined surface towards said second position.

7. Apparatus as defined in claim 4 wherein said fluid pressure operated means comprises a hydraulic piston and cylinder operably connected with said at least one segment for biasing said at least one segment means to the said first position when hydraulic pressure is applied to the piston and cylinder, and means for applying such fluid pressure by directing a portion of the coolant entering the reactor into said cylinder at the entering pressure of said fluid.

8. In a nuclear reactor having a core including fuel elements over which a fluid coolant flows, means supporting said fuel elements so as to provide at least two core segments moveable relative to each other between a first position in which said core is critical and a second position in which said core is sub-critical; means basing at least one of sad supporting means towards said second position; and means for translating energy of the coolant into force biassing said one supporting means towards said first position; said last mentioned means comprising fluid deflecting surfaces on said supporting means disposed in the path of coolant flow in said reactor in a position so that the coolant flowing in said reactor will act against said deflecting surfaces to bias said supporting means toward the said first position.

9. In a nuclear reactor having a core cooled by a flow of coolant, a plurality of bodies constituting the core, each of which bodies determines the critical state of the core, means supporting at least one such body for movement between a first position in which to render the core critical and a second position in which to render the core sub-critical, means for biasing the support means to said second position, and fluid operated means for translating energy of the coolant into force biassing said support means toward said first position.

References Cited by the Examiner
UNITED STATES PATENTS
2,780,597  2/57  Anderson _____ 204—193.34
FOREIGN PATENTS
1,166,762  6/58  France.

CARL D. QUARFORTH, Primary Examiner.
ROGER L. CAMPBELL, Examiner.